No. 871,260. PATENTED NOV. 19, 1907.
H. P. DYER.
PRESSURE REGULATOR AND REDUCER.
APPLICATION FILED JULY 15, 1907.
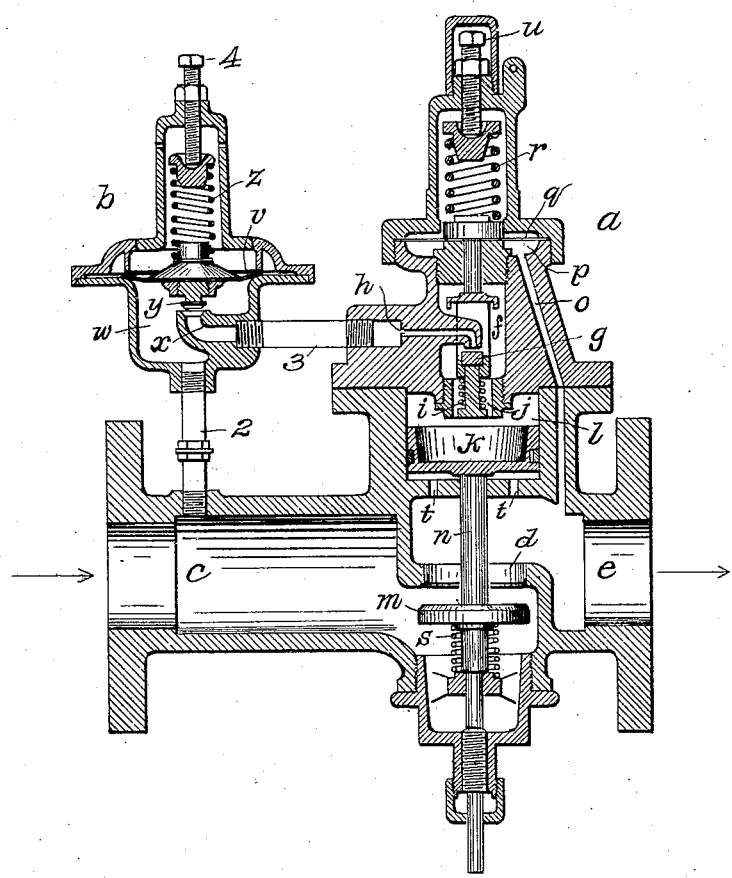
Witnesses,
H G Heaton
F. W. Mangin.
Inventor,
Harold P. Dyer,
by Luther G. Hopper,
Attorney.

UNITED STATES PATENT OFFICE.

HAROLD P. DYER, OF CLEVELAND, OHIO, ASSIGNOR TO THE DYER COMPANY, OF CLEVELAND, OHIO, A CORPORATION OF OHIO.

PRESSURE REGULATOR AND REDUCER.

No. 871,260.　　　　Specification of Letters Patent.　　　　Patented Nov. 19, 1907.

Application filed July 15, 1907. Serial No. 383,727.

*To all whom it may concern:*

Be it known that I, HAROLD P. DYER, a citizen of the United States, residing at Cleveland, in the county of Cuyahoga and State of Ohio, have invented certain new and useful Improvements in Pressure Regulators and Reducers, of which the following is a specification.

My present invention relates to fluid pressure regulating and reducing valves. Its primary object is to provide apparatus to be employed in connection with a fluid pressure pipe and a reducing valve, capable of automatic operation while the higher pressure remains at or above a predetermined degree, but to stop the delivery of fluid to the lower pressure side upon the higher pressure falling below said predetermined degree. Many devices are known which maintain the lower pressure regardless of the diminution of the higher pressure, but this device is designed to supply a certain degree of lower pressure only while the higher pressure remains above a certain normal degree. Thus, it is particularly adapted to heating, and other low pressure systems which take steam from a high pressure system, wherein it is not so important to maintain the low pressure as it is to uphold the high pressure. Minor objects will appear from the description and be set forth in claims.

To these ends, my invention consists in the features and combinations hereinafter elucidated, an embodiment thereof being illustrated in the accompanying drawing wherein—the figure is a sectional elevation taken longitudinally through the central line of the apparatus.

The reference letter $a$ indicates a pressure reducing valve which, if it took for its operation high pressure fluid directly from the main pipe in the usual and well known way, would maintain the low, or delivery pressure, until the high, or initial pressure became diminished to a low degree. But by operating the main valve apparatus $a$ with initial pressure fluid passing through a regulator $b$, I accomplish the maintenance of the low pressure as long as the high pressure is kept up to or above a certain gage standard, but immediately upon said high pressure falling below said standard the valve $b$ closes, which compels the valve $a$ to close also and thereby stop the delivery of fluid to the low pressure side. Although a main valve mechanism $a$ which takes pressure fluid for its operation directly from the high pressure main $c$ is well known in the art, I will describe it briefly, because it is essential to the operation of my complete apparatus.

In the position shown in the drawing high pressure fluid entering at $c$ passes through the main valve port $d$ to the low pressure main $e$.

$f$ is a chamber which in the ordinary regulating valve of this type receives high pressure directly from the chamber $c$ through the small auxiliary valve $g$; but in the present arrangement the high pressure is admitted through the passage $h$ from the regulator $b$, and thence through the valve $g$. A passage $j$ connects the chamber $f$ with a cylinder $l$ above a piston $k$ movable therein, which piston is rigidly connected by a rod $n$ with the main valve $m$, the latter being fitted to close the port $d$, and having a spring $s$ in compression beneath it.

$o$ is a passage from the delivery chamber $e$ to a chamber $p$ underneath a diaphragm $q$, the latter being attached to the auxiliary valve $g$, and provided with an adjustable spring $r$ in compression above it, as shown. Small ports $t$ connect the cylinder $l$ with the delivery chamber $e$.

When initial pressure enters the chamber $f$ it passes through the passage $j$ to the top of the piston $k$, thereby opening the main valve $m$. The delivery pressure passing through the passage $o$ raises the diaphragm $q$ against the spring $r$, thus allowing the spring $i$ to close the auxiliary valve $g$. The pressure in the cylinder $l$ is then equalized by the reduced pressure passing through the ports $t$ to the under side of the piston $k$, thus permitting the spring $s$ to close the main valve $m$, which is then kept closed by the initial pressure. Upon any reduction of the delivery pressure, the spring $r$ forces down the diaphragm $q$, thereby opening the auxiliary valve $g$ to again admit high pressure above the piston $k$. The delivery pressure is adjusted by a screw $u$, and, such adjustment once having been made, said delivery pressure remains constant regardless of any variable volume of discharge or variation of initial pressure, except as it is affected by the regulator $b$ which I will now proceed to describe.

The regulator $b$ may be an ordinary relief valve having its inlet 2 and its outlet 3 connected as shown, and being set to blow only at or above the degree of high pressure which it is desired to maintain; but I prefer to make it with an interior cavity divided by a diaphragm $v$, as shown. The high pressure inlet 2 enters the chamber $w$ beneath said diaphragm, and the chamber above the diaphragm communicates with the atmosphere. A valve $y$ depends from the diaphragm $v$, and has its seat in the upper termination of an extension $x$ of the outlet 3. A spring $z$ is placed in compression above said diaphragm and made adjustable by the screw 4. Thus, it is obvious that the regulator may be set so that when the initial pressure in the chamber $w$ is at or above a certain degree the valve $y$ will be opened by the lifting of the diaphragm, but immediately upon said initial pressure falling to a certain point, the spring $z$ will operate to close said valve and keep it closed until the pressure again rises above said point. And it will also readily be seen that when the valve $y$ closes, and thereby shuts off the high pressure from entering the cylinder $l$ and depressing the piston $k$, the spring $s$ will operate to close the main valve $m$, and keep it closed until high pressure is again admitted through the regulator $b$. Thus the low pressure delivery is maintained at a certain pressure regardless of volume as long as the initial high pressure is at or above a certain predetermined gage point, but immediately after the initial pressure falls below said gage point the low pressure delivery is shut off entirely.

I further point out and distinctly claim as my invention—

1. The combination with a fluid pressure pipe, of a reducing valve therein operative by both the initial and delivery pressure to normally maintain a certain delivery pressure, a passage for initial pressure and a passage for delivery pressure, to operate said reducing valve, a self-closing valve in said initial pressure passage arranged to be opened by the initial pressure, and means for closing the said reducing valve upon the closing of said self-closing valve, substantially as set forth.

2. The combination with a fluid pressure pipe, of a reducing valve therein operative by both the initial and delivery pressure to normally maintain a certain delivery pressure, a passage for initial pressure and a passage for delivery pressure, to operate said reducing valve, a valve in said initial pressure passage provided with means for keeping it closed save when the initial pressure is above a certain degree, and means for keeping said reducing valve closed while said passage valve is closed, substantially as set forth.

3. The combination with a fluid pressure pipe, of a spring-closed main valve between the initial and delivery ends of said pipe, means controlled by both the initial and delivery pressure operatively connected with said main valve for operating it to normally maintain a certain pressure in the delivery end of said pipe, a conduit between said means and the initial pressure end of said pipe whereby said means are operative, and a self-closing valve adapted to be opened by the initial pressure for controlling the passage of initial pressure through said conduit, substantially as set forth.

4. The combination with a fluid pressure pipe, of a spring-closed main valve between the initial and delivery ends of said pipe, means controlled by both the initial and delivery pressure operatively connected with said main valve for operating it to normally maintain a certain pressure in the delivery end of said pipe, a conduit between said means and the initial pressure end of said pipe whereby said means are operative, a valve in said conduit having a spring for closing it, and means whereby a certain degree of initial pressure is operative to open said last named valve, substantially as set forth.

In testimony whereof I affix my signature in the presence of two subscribing witnesses at Cleveland, Ohio, this 11th day of July, 1907.

HAROLD P. DYER.

Witnesses:
C. S. WANAMAKER,
F. A. MAURE, Jr.